2,730,838
APPLICATOR FOR APPLYING CHEMICALS TO TOBACCO PLANTS

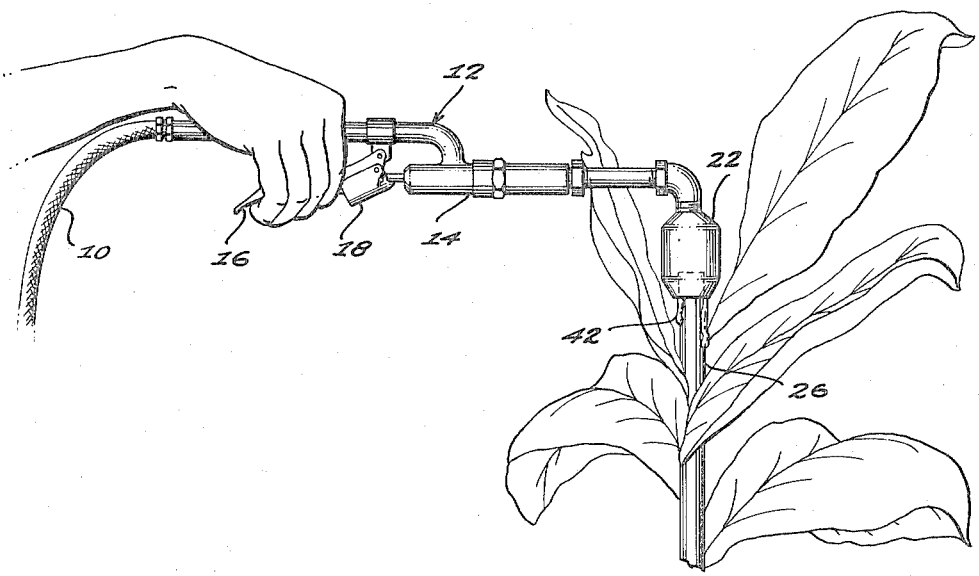
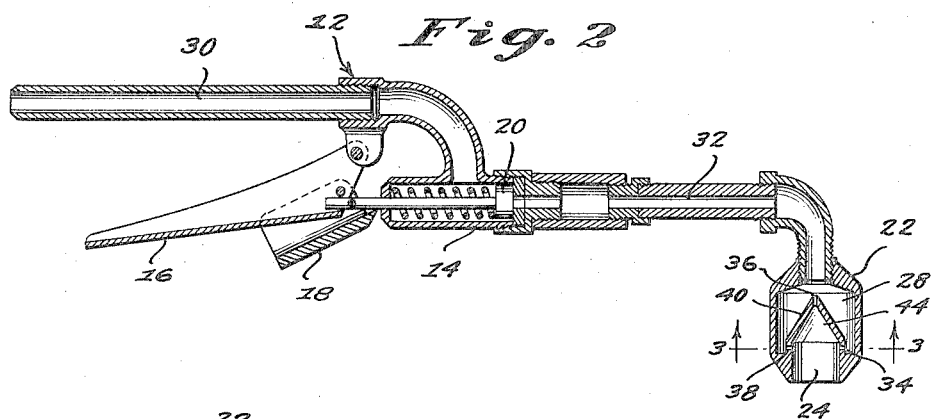
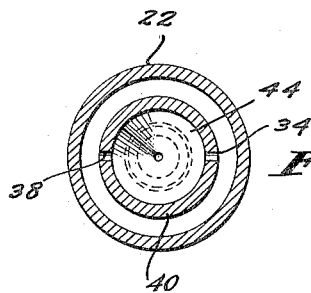
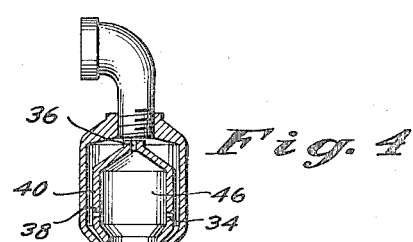
INVENTOR.
ROBERT W. WILSON
BY
Parrott, Richards & Sims
ATTORNEYS Jan. 17, 1956        R. W. WILSON        2,730,838
APPLICATOR FOR APPLYING CHEMICALS TO TOBACCO PLANTS
Filed Nov. 10, 1950        2 Sheets-Sheet 2
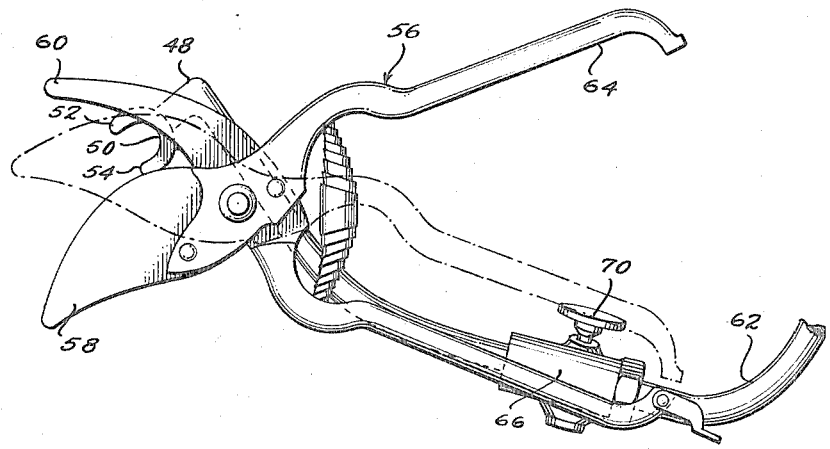
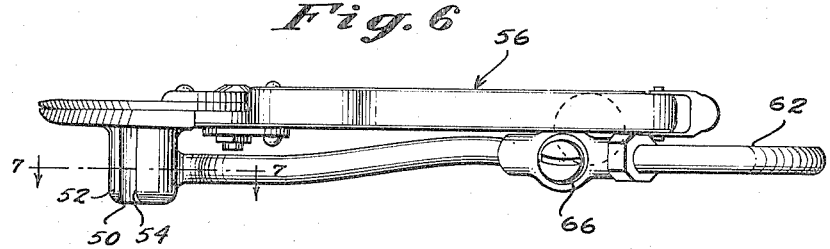
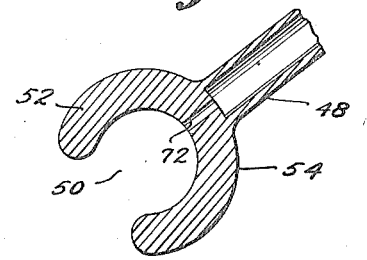
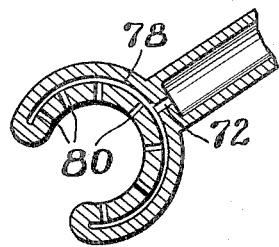
INVENTOR.
ROBERT W. WILSON
BY
Parrott, Richards & Sims
ATTORNEYS United States Patent Office 2,730,838
Patented Jan. 17, 1956

Robert W. Wilson, Raleigh, N. C., assignor, by mesne assignments, to Patent and Development, Inc., Raleigh, N. C., a corporation of North Carolina Application November 10, 1950, Serial No. 195,016

7 Claims. (Cl. 47—1)

This invention relates to the culture of tobacco and more particularly to a means of applying a chemical to the tobacco stalk to prevent or arrest growth of lateral buds, generally referred to as "suckers," at the leaf axils of the plants.

In the copending application of Anderson and Wilson, Serial No. 175,662, filed July 24, 1950 (now abandoned), it is disclosed that the growth of suckers on tobacco plants can be effectively arrested or prevented by the application of appropriate chemicals to the suckers or to the leaf axils at which they normally appear. These points of incipient lateral growth can be effectively coated or treated by applying the sucker-control chemical in liquid form to an upper portion of the stalk so that the chemical will flow downwardly along the stalk and coat its surface. A convenient time to apply the chemical to the upper end of the stalk is immediately after it has been topped.

In accordance with the present invention, a device is now provided for encircling an upper portion of the stalk and applying the sucker-control chemical to the surface so that it will distribute itself over the entire stalk and coat the areas of lateral growth. One commercially important embodiment of the present invention comprises the combination of a stalk-topping device and the liquid applicator so that the plant can be topped and the chemical applied in a single operation.

A more complete understanding of the present invention will be had from the following detailed description and accompanying drawings, in which:

Fig. 1 is a side elevation of a mechanical applicator embodying the present invention, showing its operating position with respect to the topped tobacco stalk;

Fig. 2 is a longitudinal sectional view of the device illustrated in Fig. 1;

Fig. 3 is a transverse sectional view of the device of Fig. 2, taken generally along the line 3—3;

Fig. 4 is a sectional view of a modified applicator tip;

Fig. 5 is a perspective view of the combination topper-applicator device;

Fig. 6 is a plan view of the topper-applicator illustrated in Fig. 5; and

Fig. 7 is a fragmentary section of Fig. 6, taken generally along the line 7—7.

Figure 8 is a fragmentary section of Figure 6 taken generally along the line 7—7 and illustrating a modification of the structure of the yoke.

Referring now to the drawings and in particular at first to Figs. 1 and 2, a typical applicator device includes a pressurized reservoir, not shown, containing the sucker-control liquid and having a hose or other flexible conduit 10 leading to the applicator assembly, shown generally at 12, and including valve 14, here shown equipped with levers 16 and 18 for manually operating spring-loaded valve member 20. Secured to the outlet of valve 14 is an applicator tip 22 having a recessed portion 24 adapted to receive the stump of a topped tobacco stalk 26 and being at least partly surrounded by an internal chamber 28, formed within the body of applicator tip 22 and being in communication with the reservoir by means of conduits 30 and 32 leading to and from valve 14. Communication between the recess 24 and inner chamber 28 is by means of appropriate openings, such as shown at 34, 36 and 38 (see Figs. 2 and 3), formed in wall 40 separating recess 24 and inner chamber 28.

The distribution of these openings 34, 36 and 38 is such that the sucker-control chemical, illustrated at 42 in Fig. 1, is applied uniformly to the top end of stalk 26 from whence it will run down the stalk and coat the sucker buds. Preferably, these openings 34, 36 and 38 should be located so that the sprays from them are directed to a common point, so that it will not be possible to have a "run-away" spray from the applicator. The amount of chemical applied to the stalk is controlled by the operator, who maintains valve 14 in open position by manipulation of the levers 16 and 18, for the necessary time to allow the escape of the proper amount through the openings 34, 36 and 38, or a metering type of valve might be incorporated in the device, if desired, so that the proper amount of chemical could be predetermined and applied automatically.

The inner end wall of recess 24 may be conically shaped, as shown at 44, to aid in centering the tobacco stalk in the recess, which, in turn, aids in producing uniform distribution of the chemical 42 around stalk 26. Also, it should be noted that the applicator tip 22 is tapered externally adjacent the opening of recess 24 which keeps the chemical close to the stalk and avoids the danger of it dropping off on to the leaves.

Fig. 4 represents a slightly modified applicator tip in which an intermediate portion of the recess 24 is of increased diameter, as shown at 46. This provides additional clearance between the end of stalk 26 and the inner walls 40, so that the flow of chemical through openings 34, 36 and 38 is not retarded by the tobacco stalk, although the constricted form of the opening of recess 24 is such that the chemical will drop off close to the stalk.

A combination topper and chemical applicator embodying the present invention, as previously mentioned, is illustrated in Figs. 5, 6 and 7, in which the applicator tip 48 is formed with a generally U-shaped, or yoke shaped, recess 50 at its extending end to receive an up-topped stalk, not shown. In this embodiment, the applicator tip 48, by virtue of the yoke shaped recess 50 with which it is formed, can be slipped around the stalk to enclose it within the arms of the yoke 50 as at 52 and 54. Secured to applicator tip 48 is a stalk-shearing device, shown generally at 56, which is so arranged that the shearing movement of cutting parts 58 and 60 is transverse to the longitudinal axis of the yoke or recess 50. A convenient arrangement is shown in Fig. 5, wherein one blade 60 is stationary with respect to applicator tip 48, and the other blade 58 is arranged to be moved by a handle arm 64 generally transversely of the recess 50 from the open side to the closed side to hold the tobacco stalk in recess 50 and prevent its being dislodged during the shearing action.

A valve 66 in line 62 leading to applicator tip 48 is so disposed with respect to the moving handle arm 64 of shears 56, that during the final portion of the cutting of the stalk, valve 66 is opened and the chemical flows through the appropriate openings in the side wall of tip 48 onto the peripheral portion of the tobacco stalk. This is conveniently accomplished, as illustrated in Figs. 5 and 6, by means of the spring-loaded valve 66 having button 70 adapted to be depressed by the moving handle 64 in such a way as to open valve 66, which may be a metering type of valve, if desired, as mentioned above. The dotted lines in Fig. 5 indicate actuation in this manner of the valve 66 by the cutter handle 64. The blades 58 and 60 serve to guide the tobacco stalk into the applicator tip 48 and to hold it there during the topping.

If desired, the body of applicator tip 48 can be formed with an internal chamber 78 and additional openings 80 to recess 50 so that the stream of chemical can be directed onto the tobacco stalk from spaced points around the periphery, as in the previous embodiments described above, as illustrated in Figure 8. However, a single opening, as shown at 72 in Fig. 7, may accomplish the same purpose if the operator rotates the device slightly while the chemical is flowing therethrough. In any event, the inner walls of the yoke extend downwardly below the port or ports a substantial distance so as to form a shield which will confine the chemical flowing through the ports to the walls of the stalk and will prevent any undesirable spraying of the chemical on the leaves and other portions of the plant.

The above-described applicators, and particularly the combination topper-applicator device, have made it possible to treat tobacco plants for suckers in a far shorter time than has heretofore been required for topping and suckering tobacco plants. In a typical example, using the above-described topper-applicator, one man is able to cut off the tops of the tobacco plants and apply the chemical to an acre of tobacco in about three and one-half to five hours. The methods heretofore used for topping and suckering tobacco plants required from about twenty-five to fifty man-hours per acre, so that the saving in labor as a result of the device of the present invention is quite substantial.

The scope of the present invention is indicated in the following claims.

I claim:

1. A device for applying a liquid sucker-control chemical to the stalk of a topped tobacco plant comprising a tubular receptacle having a closed end and a surrounding internal chamber formed within the wall of said receptacle, said internal chamber being in communication with said recessed portion by means of openings positioned at spaced intervals around the inner wall so as to direct a sucker-control chemical onto the tobacco stalk, conduit means leading from a pressurized source of said chemical to said internal chamber, and valve means interposed in said conduit for controlling the flow of chemical therethrough, said tubular receptacle extending below said openings a substantial distance to form a shield which will confine the chemical to the walls of the stalk.

2. A device for applying a sucker-control chemical to the stalk of a topped tobacco plant, comprising a cylindrical applicator tip having a recessed portion adapted to receive the end of the topped tobacco stalk, said recessed portion including a conical portion at its inner extremity adapted to effect symmetrical disposition of a tobacco stalk within said recessed portion, said device having outlet ports positioned at spaced intervals and opening into said recessed portion, in communication with a pressurized source of liquid sucker-control chemical, and means for controlling the flow of said chemical to said ports, said applicator tip extending below said ports a substantial distance to form a shield which will confine the chemical to the walls of the stalk.

3. In a device for applying a liquid sucker-control chemical to the stump of a topped tobacco stalk including a pressurized chemical reservoir, a conduit means leading therefrom and a valve in said conduit means for controlling the flow of chemical therethrough, an improved applicator tip for distributing said chemical on said tobacco stalk, comprising a hollow tubular body having a recessed portion formed in the wall thereof adapted to receive the upper end of the topped tobacco stalk, said recessed portion having a conical configuration at its inner end for centering the tobacco stalk therein and further having openings positioned at spaced intervals around the inner wall thereof for directing said chemical onto said tobacco stalk, said applicator tip extending below said openings a substantial distance to form a shield which will confine the chemical to the walls of the stalk.

4. A topper-applicator device for topping a tobacco stalk and simultaneously applying a liquid sucker-control chemical to the stump of said stalk, comprising a generally U-shaped member adapted to receive the stalk of a tobacco plant therein, outlet ports positioned at spaced intervals around the inner peripheral surface of said member and in communication with a source of chemical supply, a stalk cutter associated with said U-shaped member and adapted to retain the stalk therein during the cutting operation, means associated with said cutter controlling the flow of chemical to said outlet ports whereby said chemical is released onto said stalk at the time said stalk is topped.

5. A combination topper-applicator for topping a tobacco plant and applying a sucker-control chemical thereto in a single operation, comprising a saddle-like applicator member adapted to receive a tobacco stalk, said applicator being provided with outlet ports positioned at spaced intervals around the inner peripheral surface disposed to direct the effluent therefrom onto the side of said stalk, conduit means leading to said outlet port from a source of chemical supply, a flow control valve in said conduit controlling the flow of chemical therethrough, a stalk cutter pivotally secured to said applicator and adapted to engage said stalk in a manner to prevent lateral displacement thereof from said applicator and to sever said stalk, said cutting means being associated with said flow control valve to open said valve when said stalk is severed and thereby cause said sucker-control chemical to be sprayed onto the upper portion of said stalk.

6. An applicator for applying a sucker-control chemical to the stalk of a topped tobacco plant comprising a shielded applicator tip, said shield being positioned to confine the said sucker-control chemical to the said stalk and said tip formed with a recess having an inner wall and adapted to receive and position the end of said stalk therein, and having outlet ports positioned at spaced intervals around the inner wall so as to direct said sucker-control chemical onto the said stalk, conduit means connecting said ports with a supply of sucker-control chemical and means interposed in said conduit means controlling the flow of chemical therethrough to said ports.

7. An applicator for applying a sucker-control chemical to a stalk of a topped tobacco plant, comprising an applicator tip formed with a recess having an inner wall and adapted to receive and position the end of said stalk therein, and having outlet ports positioned at spaced intervals around the inner wall so as to direct a sucker-control chemical onto the tobacco plant, conduit means connecting said ports with a supply of sucker-control chemical, and means interposed in said conduit means controlling the flow of chemical therethrough to said ports whereby said sucker-control chemical can be released onto the stalk disposed within said applicator, said applicator extending below said ports a substantial distance to form a shield which will confine the chemical to the walls of the stalk.

References Cited in the file of this patent

UNITED STATES PATENTS

| | | |
|---|---|---|
| 773,743 | Von Hoffmann | Nov. 1, 1904 |
| 954,126 | McAllister | Apr. 5, 1910 |
| 1,056,046 | Myers | Mar. 18, 1913 |
| 1,135,346 | Barnhart | Apr. 13, 1915 |
| 1,262,865 | Stocking | Apr. 16, 1918 |
| 1,611,681 | Schling | Dec. 21, 1926 |
| 1,682,544 | Young | Aug. 28, 1928 |
| 1,865,914 | Jaden | July 5, 1932 |
| 1,868,235 | Jaden | July 19, 1932 |

FOREIGN PATENTS

| | | |
|---|---|---|
| 491,531 | Germany | Feb. 11, 1930 |
| 7,386 | Great Britain | of 1884 |